US011023601B2

(12) United States Patent
Quint (10) Patent No.: US 11,023,601 B2
(45) Date of Patent: Jun. 1, 2021

(54) SYSTEM AND METHOD FOR SECURE DATA HANDLING

(71) Applicant: Rohde & Schwarz GmbH & Co. KG, Munich (DE)

(72) Inventor: Alexander Bruno Quint, Alsbach (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 257 days.

(21) Appl. No.: 15/958,857

(22) Filed: Apr. 20, 2018

(65) Prior Publication Data
US 2019/0325153 A1  Oct. 24, 2019

(51) Int. Cl.
| G06F 21/62 | (2013.01) |
| G06F 16/188 | (2019.01) |
| G06F 21/60 | (2013.01) |
| H04L 29/06 | (2006.01) |
| H04L 29/08 | (2006.01) |

(52) U.S. Cl.
CPC ........ *G06F 21/6209* (2013.01); *G06F 16/188* (2019.01); *G06F 21/602* (2013.01); *H04L 63/0442* (2013.01); *H04L 63/08* (2013.01); *H04L 67/1097* (2013.01); *G06F 2221/2107* (2013.01)

(58) Field of Classification Search
None
See application file for complete search history.

(56) References Cited

U.S. PATENT DOCUMENTS

| 7,685,596 | B1 * | 3/2010 | Webb | G06F 8/61 717/177 |
| 2002/0075293 | A1 * | 6/2002 | Charisius | G06Q 10/06 715/704 |
| 2003/0014585 | A1 * | 1/2003 | Ji | G06F 3/0601 711/112 |
| 2006/0179325 | A1 * | 8/2006 | Debiez | G06F 21/80 713/193 |
| 2006/0259949 | A1 * | 11/2006 | Schaefer | H04L 63/0428 726/1 |
| 2008/0141039 | A1 * | 6/2008 | Matze | G11B 20/00086 713/193 |
| 2008/0189558 | A1 * | 8/2008 | Hughes | G06F 21/80 713/193 |
| 2008/0228770 | A1 * | 9/2008 | Halcrow | G06F 16/119 |
| 2008/0263113 | A1 * | 10/2008 | Krishnaiyer | G06F 16/1727 |

(Continued)

OTHER PUBLICATIONS

European Office Action for related European Patent Application No. 18198771.0-1218 dated Apr. 8, 2019, 8 Pages.

*Primary Examiner* — Jason Chiang
(74) *Attorney, Agent, or Firm* — Ditthavong, Steiner & Mlotkowski (57) ABSTRACT

A system for secure data handling is provided. The system comprises at least one data gate, authentication data of users accessing the at least one data gate, at least one original file comprising content data and/or meta data, and at least one virtual file comprising at least parts of the meta data. In this context, the at least one data gate is configured to generate and/or store the at least one virtual file on the basis of the at least one original file. In addition to this, the at least one data gate is further configured to generate and/or store at least one encrypted file on the basis of the at least one original file preferably using at least parts of the authentication data as key.

16 Claims, 5 Drawing Sheets

(56) References Cited

U.S. PATENT DOCUMENTS

| | | | |
|---|---|---|---|
| 2010/0287219 A1* | 11/2010 | Caso | G06F 16/134 |
| | | | 707/827 |
| 2011/0138487 A1* | 6/2011 | Cohen | G06F 21/79 |
| | | | 726/32 |
| 2011/0289178 A1* | 11/2011 | Ittah | G06F 21/79 |
| | | | 709/213 |
| 2012/0317239 A1 | 12/2012 | Mulder et al. | |
| 2014/0006350 A1* | 1/2014 | Fukui | G06F 16/192 |
| | | | 707/632 |
| 2014/0006540 A1 | 1/2014 | Rao et al. | |
| 2014/0281514 A1* | 9/2014 | Erofeev | H04L 9/0897 |
| | | | 713/165 |
| 2015/0052354 A1* | 2/2015 | Purohit | G06F 21/6272 |
| | | | 713/165 |
| 2015/0128293 A1* | 5/2015 | Hitomi | H04L 65/60 |
| | | | 726/29 |
| 2015/0163206 A1 | 6/2015 | McCarthy et al. | |
| 2015/0365385 A1 | 12/2015 | Hore | |
| 2015/0379295 A1* | 12/2015 | Branton | G06F 21/6218 |
| | | | 713/165 |
| 2016/0246816 A1* | 8/2016 | Abiri | G06F 16/192 |
| 2018/0307847 A1* | 10/2018 | Lee | H04L 9/06 |
| 2018/0316649 A1* | 11/2018 | Testerman | G06F 16/183 |

\* cited by examiner

SYSTEM AND METHOD FOR SECURE DATA HANDLING

TECHNICAL FIELD

The invention relates to a system and a method for secure data handling.

BACKGROUND ART

Generally, in times of an increasing number of applications processing data, especially encrypted data, with respect to cloud environments, there is a growing need of a system and a method for secure data handling especially in order to protect sensitive data from unauthorized access in an efficient manner.

U.S. 2014/0006540 A1 discloses a cloud or network server based storage and processing system for portable electronic devices including mobile devices and cellular telephones. The server based data, applications and user interface components may overcome limited local storage and processing on mobile devices. Cloud server data may be accessible from multiple mobile devices or applications. Data may be saved to and downloaded from private cloud intranet servers or public cloud Internet servers. A mobile device may access a network server using a central multi-channel multiplexing transmit/receive device or access point. In this context, networked data may be secured, whereby authentication may include user names and passwords. As it can be seen, due to the fact that data may exclusively be secured with said authentication, sensitive data is not protected in a highly efficient manner.

Accordingly, there is a need to provide a system and a method for secure data handling, whereby high efficiency is especially ensured.

SUMMARY OF THE INVENTION

According to a first aspect of the invention, a system for secure data handling is provided. The system comprises at least one data gate, authentication data of users accessing the at least one data gate, at least one original file comprising content data and/or meta data, and at least one virtual file comprising at least parts of the meta data. In this context, the at least one data gate is configured to generate and/or store the at least one virtual file on the basis of the at least one original file.

According to a first preferred implementation form in addition to this, the at least one data gate is further configured to generate and/or store at least one encrypted file on the basis of the at least one original file using at least parts of the authentication data as key. Additionally or alternatively, said key may be derived from at least parts of the authentication data. Advantageously, a high efficiency with respect to secure data handling can be ensured.

According to a second preferred implementation form of the first aspect of the invention, the at least one data gate is further configured to receive and/or process at least one user input signal with respect to the at least one virtual file. Additionally or alternatively, the at least one data gate is further configured to recover the at least one original file on the basis of the at least one encrypted file using at least parts of the authentication data as the key. Advantageously, efficiency regarding secure data handling can further be increased.

According to a further preferred implementation form of the first aspect of the invention, the at least one user input signal with respect to the at least one virtual file is initiator for the at least one data gate to recover the at least one original file. Additionally or alternatively, the authentication data of at least two separate users represent asymmetric encryption keys. In further addition to this or as a further alternative, the authentication data are derived from user identity. Advantageously, an increased data security can be ensured.

According to a further preferred implementation form of the first aspect of the invention, the system further comprises at least one data storage. In this context, the at least one data gate is further configured to divide and/or store the at least one encrypted file on at least two of the at least one data storage. Advantageously, data security can further be increased.

According to a further preferred implementation form of the first aspect of the invention, the system further comprises at least one data storage, wherein the at least one data gate is further configured to store the at least one encrypted file in predefined restricted regions with respect to the at least one data storage. Advantageously, the risk of data theft can further be reduced.

According to a further preferred implementation form of the first aspect of the invention, the system further comprises at least one data storage, wherein the at least one data storage is connected to the Internet. Advantageously, this allows for collaboration within cloud environments.

According to a further preferred implementation form of the first aspect of the invention, the system further comprises at least one data storage. In this context, the at least one data storage is configured to manage handling of the at least one virtual file in workflows. Advantageously, efficiency can further be increased.

According to a further preferred implementation form of the first aspect of the invention, an user input is a file opening request or an input action with the aid of an input device. For instance, said input action may advantageously be a keyboard input or a mouse input, preferably a double-click with the aid of a mouse.

According to a further preferred implementation form of the first aspect of the invention, the at least one data gate is further configured to generate security data on the basis of the authentication data. Advantageously, data security can further be increased.

According to a further preferred implementation form of the first aspect of the invention, the at least one data gate is further configured to add security data to the at least one virtual file. Advantageously, an enhanced data security can be achieved.

According to a further preferred implementation form of the first aspect of the invention, at least one key for decryption and/or encryption is defined for a group of authentication data. Advantageously, decryption and/or encryption can be realized in a very efficient manner.

According to a further preferred implementation form of the first aspect of the invention, security information with at least parts of keys or keys is linked and/or stored with reference to the at least one virtual file and/or the at least one encrypted file. Advantageously, efficiency with respect to secure data handling can further be increased.

According to a further preferred implementation form of the first aspect of the invention, decryption uses key data in reference security data of each of the at least one virtual file. Advantageously, decryption can be performed in a very efficient manner.

According to a second aspect of the invention, a method for secure data handling is provided. The method comprises the steps of generating and/or storing at least one virtual file comprising at least parts of meta data on the basis of at least one original file comprising content data and/or the meta data with the aid of at least one data gate.

According to a first preferred implementation form generating and/or storing at least one encrypted file is done on the basis of the at least one original file using at least parts of authentication data of users accessing the at least one data gate as key. Additionally or alternatively, the key may be derived from at least parts of the authentication data. Advantageously, a high efficiency with respect to secure data handling can be ensured.

According to a second preferred implementation form of the second aspect of the invention, the method further comprises the steps of receiving and/or processing at least one user input signal with respect to the at least one virtual file, and/or recovering the at least one original file on the basis of the at least one encrypted file using at least parts of the authentication data as key. Advantageously, efficiency regarding secure data handling can further be increased.

According to a further preferred implementation form of the second aspect of the invention, the at least one user input signal with respect to the at least one virtual file is initiator for the at least one data gate to recover the at least one original file. Additionally or alternatively, the authentication data of at least two separate users represent asymmetric encryption keys. Advantageously, an increased data security can be ensured.

According to a further preferred implementation form of the second aspect of the invention, the method further comprises the step of dividing and/or storing the at least one encrypted file on at least two data storages. Advantageously, data security can further be increased.

According to a further preferred implementation form of the second aspect of the invention, the method further comprises the step of storing the at least one encrypted file in predefined restricted regions with respect to at least one data storage. In addition to this or as an alternative, the method further comprises the step of using key data in reference security data of each of the at least one virtual file for decryption. Advantageously, the risk of data theft can further be reduced. Further advantageously, decryption can be performed in a very efficient manner.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
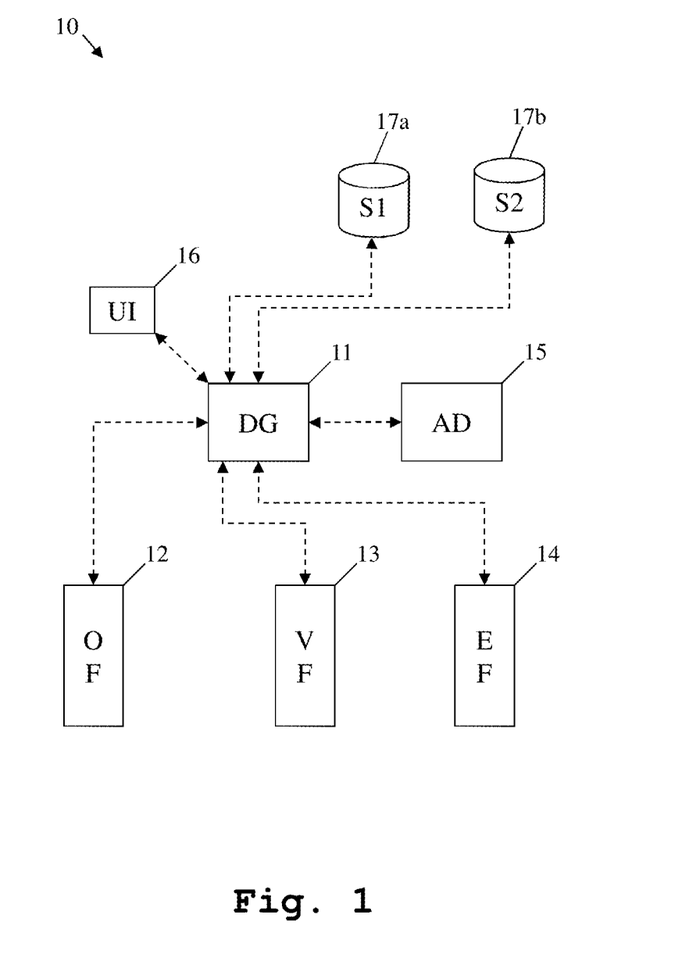
FIG. 1 shows an exemplary embodiment of the first aspect of the invention.

Firstly, FIG. 1 illustrates an exemplary embodiment of an inventive system 10 for secure data handling. The system 10 comprises at least one data gate, exemplarily the data gate 11, authentication data 15 of users accessing the data gate 11, at least one original file, exemplarily the original file 12, comprising content data and/or meta data, and at least one virtual file, exemplarily the virtual file 13, comprising at least parts of the meta data.

In this context, the data gate 11 is configured to generate and/or store the at least one virtual file 13 on the basis of the original file 12. Additionally, the data gate 11 is further configured to generate and/or store at least one encrypted file, exemplarily the encrypted file 14, on the basis of the original file 12 using at least parts of the authentication data 15 as key.

Furthermore, the data gate 11 may further be configured to receive and/or process at least one user input signal, exemplarily the user input signal 16, with respect to the virtual file 13. Additionally or alternatively, the data gate 11 may further be configured to recover the original file 12 on the basis of the encrypted file 14 using at least parts of the authentication data 15 as the key.

Moreover, the user input signal 16 with respect to the virtual file 13 may be initiator for the data gate 11 to recover the original file 12. In addition to this or as an alternative, the authentication data 15 of at least two separate users may represent asymmetric encryption keys. In this context, additionally or alternatively, the authentication data 15 may be derived from user identity.

It is noted that it might be further advantageous if the system further comprises at least one data storage, exemplarily the data storages 17a and 17b. In this context, the data gate 11 may further be configured to divide and/or store the encrypted file 14 on at least two of the at least one data storage, exemplarily on said two data storages 17a and 17b.

Furthermore, the data gate 11 may further be configured to store the encrypted file 14 in predefined restricted regions with respect to the at least one of the data storages 17a and 17b.

In addition to this, it is noted that it might be particularly advantageous, if at least one of the data storages 17a, 17b is connected to the Internet.

Moreover, at least one of the data storages 17a, 17b may be configured to manage handling of the virtual file 13 in workflows.

With respect to the inventive system 10, it should be mentioned that an user input may be a file opening request or an input action with the aid of an input device. For instance, said input action may advantageously be a keyboard input or a mouse input, preferably a double-click with the aid of a mouse.

Furthermore, it is noted that the data gate 11 may further be configured to generate security data on the basis of the authentication data 15. Additionally or alternatively, the data gate 11 may further be configured to add security data to the virtual file 13.

It might be further advantageous if at least one key for decryption and/or encryption is defined for a group of authentication data.

Moreover, security information with at least parts of keys or keys may advantageously be linked and/or stored with reference to the virtual file 13 and/or the encrypted file 14. In addition to this or as an alternative, decryption may use key data in reference security data of the virtual file 13.

Figure 2:
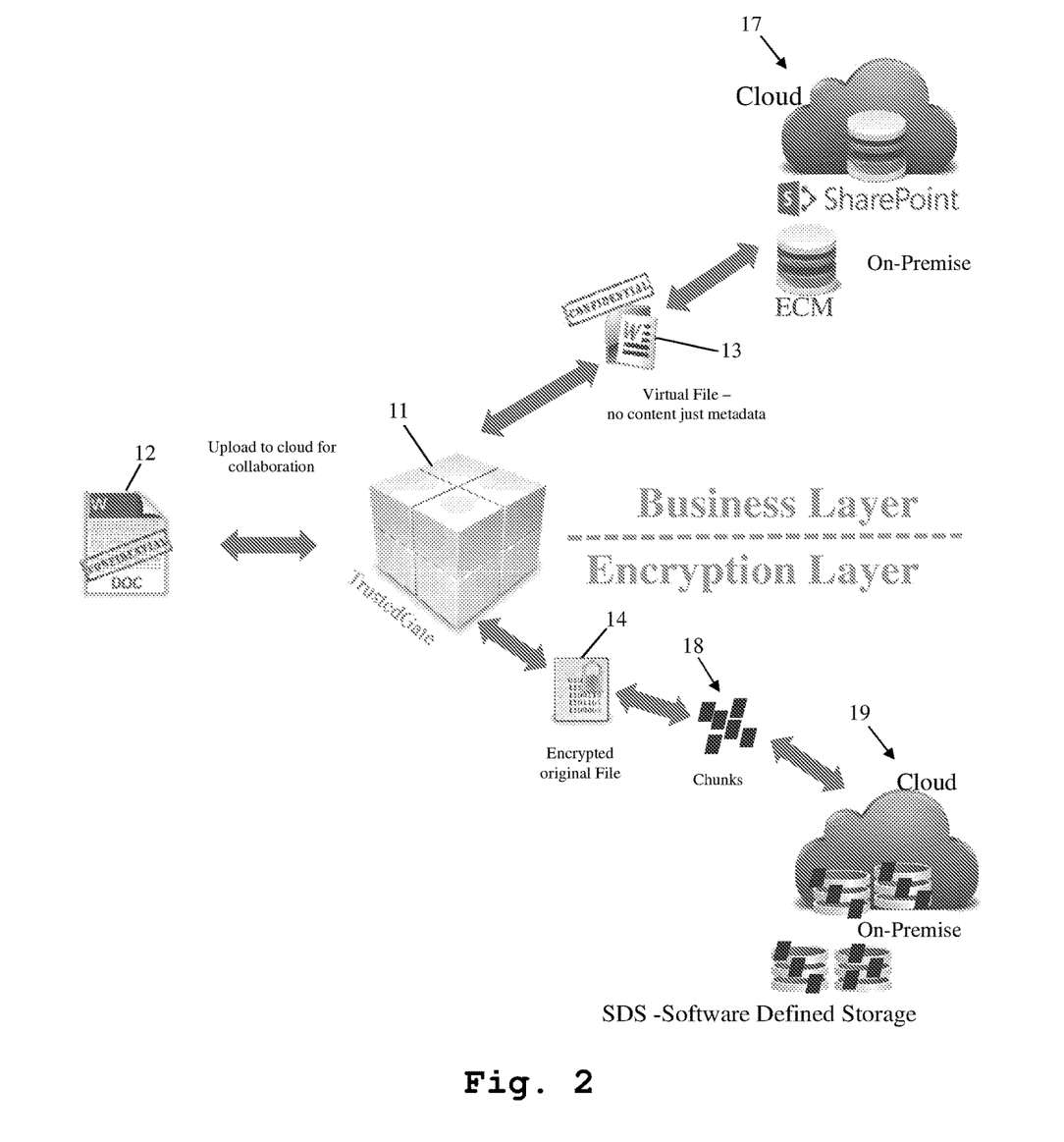
FIG. 2 shows a further exemplary embodiment of the first aspect of the invention.

Now, with respect to FIG. 2, FIG. 2, a further exemplary embodiment of the inventive system is illustrated. As it can be seen, a majority of the elements of said system have the same reference signs as in FIG. 1. Due to the fact that these elements have already been described with respect to FIG. 1, the respective elements will not completely be described again in the context with FIG. 2.

From FIG. 2, it is evident that the original file 12, exemplarily a confidential file, is uploaded to a cloud environment especially for collaboration. In this context, the virtual file 13, especially comprising exclusively meta data, is stored to a data storage 17. Said data storage 17 may comprise a cloud storage, a share point, an on-premise storage, an ECM (Enterprise Content Management) storage, or any combination thereof.

Furthermore, the encrypted file 14, especially the encrypted original file, is divided into a plurality of chunks 18. Said plurality of chunks 18 is spread over a plurality of storage mediums of the data storage 19. Said data storage 19 may comprise a cloud storage, an on-premise storage, a software-defined storage, or any combination thereof.

As it can further be seen from FIG. 2, the architecture of the inventive system for secure data handling can advantageously be divided into two major layers: a business layer especially comprising the virtual file 13 and the storage thereof, and an encryption layer especially comprising the encrypted file 14, said plurality of chunks 18 of the encrypted file 14, and the storage thereof.

Figure 3:
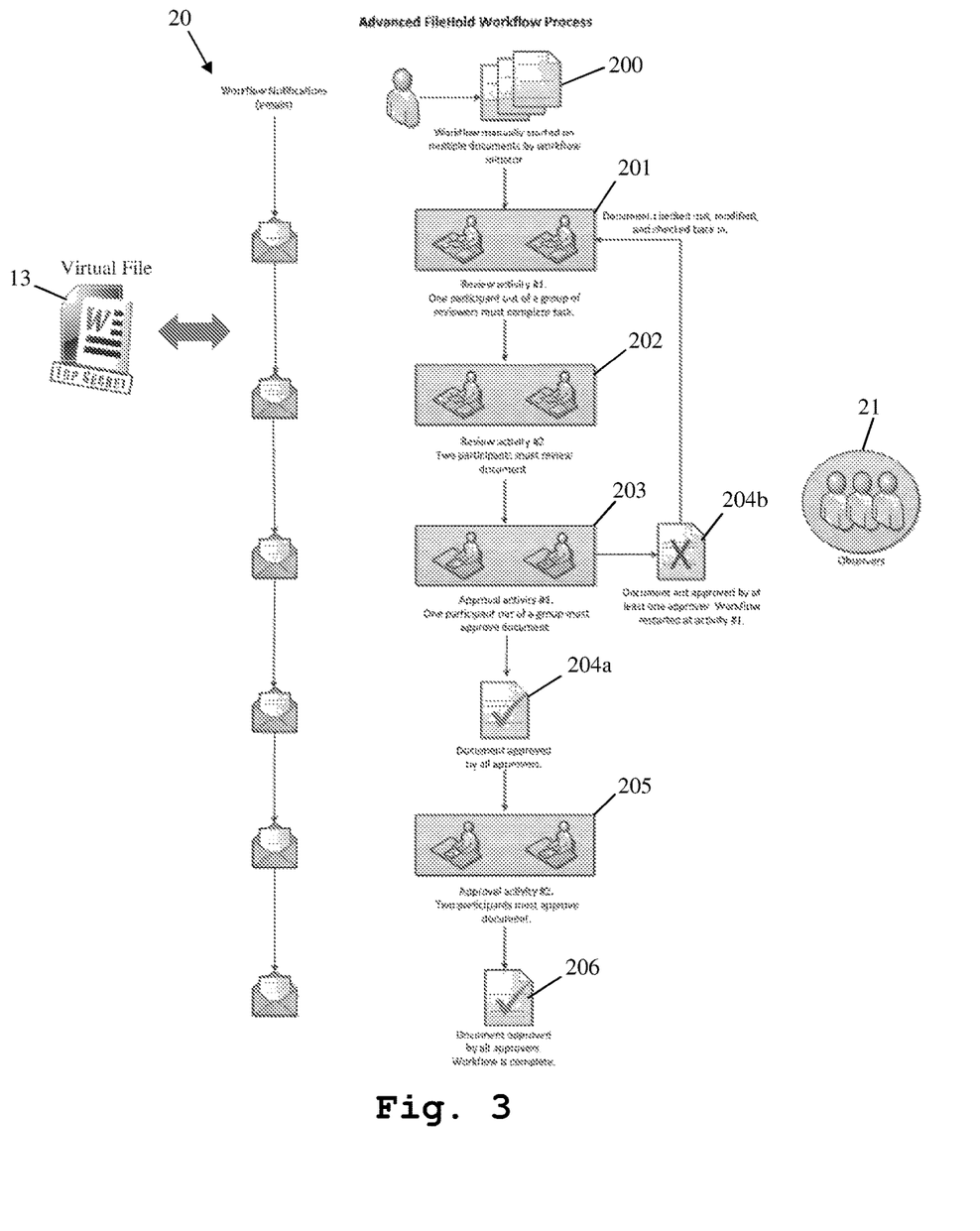
FIG. 3 shows an exemplary embodiment of an advanced workflow for handling a virtual file.

FIG. 3 depicts an exemplary embodiment of an advanced workflow for handling a virtual file. It is noted that the shown workflow process optionally comprises workflow notifications 20, preferably in the form of emails, and observers 21.

According to FIG. 3, in a first step 200, a workflow initiator manually starts the workflow on multiple documents. Then, in a second step 201, as a first review activity, one participant out of a group of reviewers has to complete the respective task.

In addition this, in a third step 202, as a second review activity, two participants have to review the respective document. Furthermore, in a fourth step 203, as a first approval activity, one participant out of a group has to approve the respective document.

As it can be seen, if the respective document is not approved by at least one approver (step 204b), the workflow is restarted at the above-mentioned first review activity or the second step 201, respectively.

Otherwise, if the respective document has been approved by all approvers according to step 204a, two participants have to approve the respective document according to step 205 or the second approval activity, respectively. Finally, in accordance with step 206, the respective document has been approved by all approvers, which leads to the fact that the workflow is complete.

Figure 4:
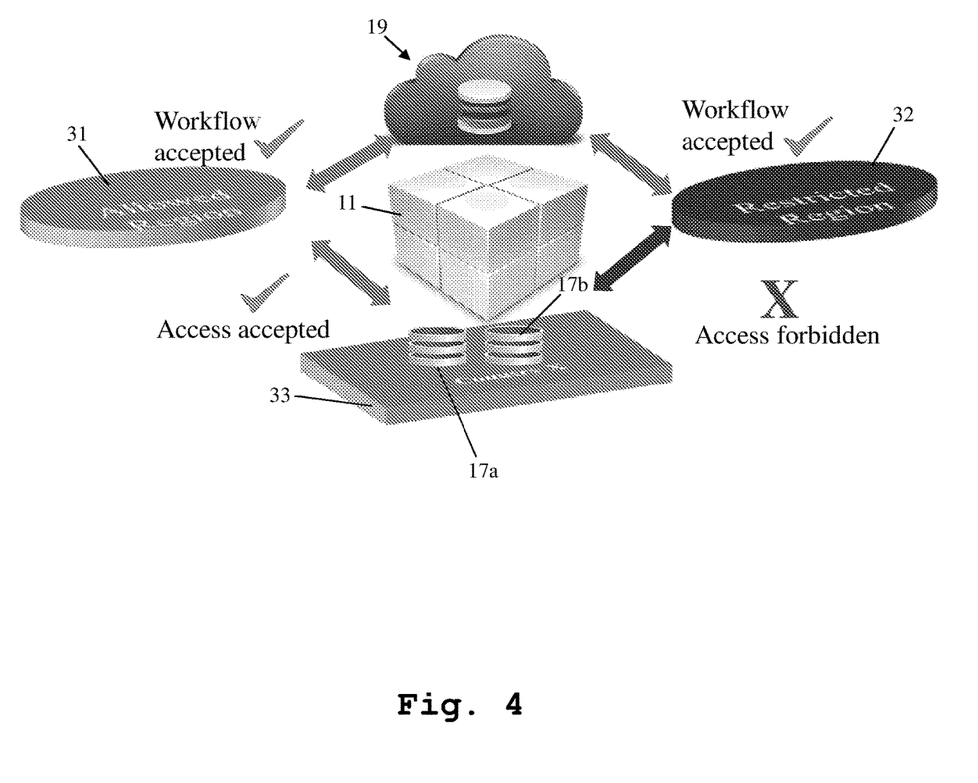
FIG. 4 shows an exemplary embodiment of a definition of a restricted region in accordance with the invention.

Moreover, FIG. 4 illustrates an exemplary embodiment of a definition of a restricted region in accordance with the invention. As it can be seen, some of the elements of said FIG. 4 have the same reference signs as in the foregoing figures. Due to the fact that these elements have already been described with respect to foregoing figures, the respective elements will not completely be described again in the context with FIG. 4.

In this context, the data gate 11 is especially configured to store the encrypted file 14 (not shown) in predefined restricted regions with respect to the available data storages 19. In this manner, the risk of data theft can advantageously be reduced.

FIG. 4 exemplarily depicts an allowed region 31, a restricted region 32, a data storage 17, especially a cloud storage, and a certain country 33, especially Country X, comprising the two data storages 17a, 17b.

Whereas between Country X and the allowed region 31, access is exemplarily accepted, access is forbidden between Country X and the restricted region 32. In addition to this, it is noted that whereas between the allowed region 31 and the cloud environment especially comprising the data storage 17, a workflow is accepted, the respective workflow between the cloud environment and the restricted region 32 is advantageously also accepted even though said region 32 is restricted.

Figure 5:
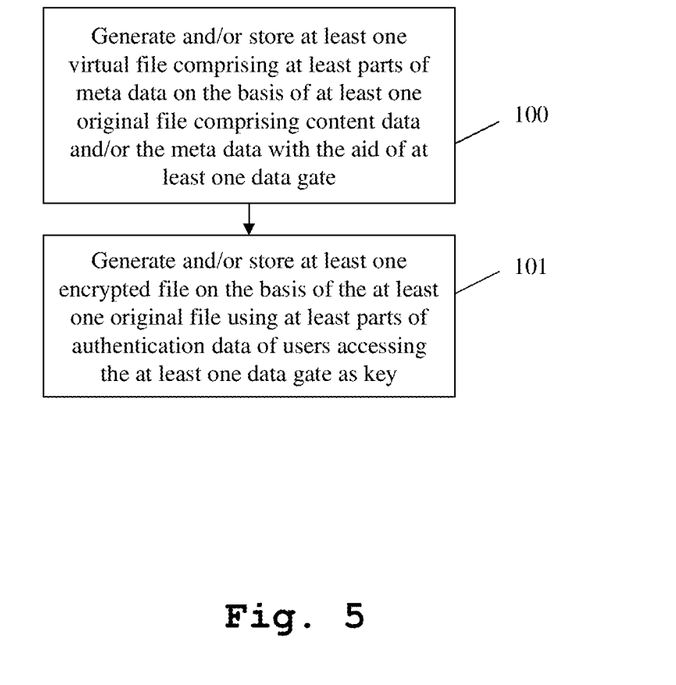
FIG. 5 shows a flow chart of an exemplary embodiment of the second aspect of the invention.

Finally, FIG. 5 shows a flow chart of an exemplary embodiment of the inventive method for secure data handling. In a first step 100, at least one virtual file comprising at least parts of meta data is generated and/or stored on the basis of at least one original file comprising content data and/or the meta data with the aid of at least one data gate. Then, in a second step 101, at least one encrypted file is generated and/or stored on the basis of the at least one original file using at least parts of authentication data of users accessing the at least one data gate as key.

In addition to this, the method may further comprise the steps of receiving and/or processing at least one user input signal with respect to the at least one virtual file. Additionally or alternatively, the method may further comprise recovering the at least one original file on the basis of the at least one encrypted file using at least parts of the authentication data as key.

Furthermore, the at least one user input signal with respect to the at least one virtual file may be initiator for the at least one data gate to recover the at least one original file. Additionally or alternatively, the authentication data of at least two separate users represent asymmetric encryption keys.

It might be further advantageous, if the method further comprises the step of dividing and/or storing the at least one encrypted file on at least two data storages.

Moreover, the method may further comprise the step of storing the at least one encrypted file in predefined restricted regions with respect to at least one data storage. In addition to this or as an alternative, the method may further comprise the step of using key data in reference security data of each of the at least one virtual file for decryption.

In this context, it is noted that at least one of the above-mentioned data storages may be connected to the Internet. Additionally or alternatively, an user input may be a file opening request or an input action with the aid of an input device.

Furthermore, the method may further comprise the step of managing handling of the at least one virtual file in workflows.

Moreover, it might be particularly advantageous, if the method further comprises the step of generating security data on the basis of the above-mentioned authentication data. In addition to this or as an alternative, the method may further comprise the step of adding security data to the at least one virtual file.

It is further noted that it might be advantageous if the method further comprises the step of defining at least one key for decryption and/or encryption with respect to a group of authentication data.

Furthermore, the method may further comprise the step of linking and/or storing security information with at least parts of keys or keys with reference to the at least one virtual file and/or the at least one encrypted file.

While various embodiments of the present invention have been described above, it should be understood that they have been presented by way of example only, and not limitation. Numerous changes to the disclosed embodiments can be made in accordance with the disclosure herein without departing from the spirit or scope of the invention. For example, a current may be measured instead of a voltage.

Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A system for secure data handling, comprising:
   at least one data gate,
   authentication data of users accessing the at least one data gate,
   at least one original file comprising content data and/or meta data,
   at least one virtual file comprising at least parts of the meta data, and
   at least one data storage,
   wherein the at least one data gate is configured to generate and/or store the at least one virtual file on the basis of the at least one original file,
   wherein the at least one data gate is further configured to add security data to the at least one virtual file,
   wherein a business layer comprising the virtual file is divided from an encryption layer comprising a plurality of chunks of at least one encrypted file,
   wherein the at least one data gate is further configured to store the at least one encrypted file in predefined restricted regions with respect to the at least one data storage,
   wherein access is forbidden between the predefined restricted regions and the at least one data storage whereas access is allowed between an allowed region and the at least one data storage, and
   wherein a workflow is accepted between the allowed region and a cloud environment and/or between the cloud environment and the predefined restricted region.

2. The system according to claim 1,
   wherein the at least one data gate is further configured to generate and/or store the at least one encrypted file on the basis of the at least one original file using at least parts of the authentication data as key, and/or
   wherein the at least one data gate is further configured to receive and/or process at least one user input signal with respect to the at least one virtual file, and/or
   wherein the at least one data gate is further configured to recover the at least one original file on the basis of the at least one encrypted file using at least parts of the authentication data as the key.

3. The system according to claim 2,
   wherein the at least one user input signal with respect to the at least one virtual file is an initiator for the at least one data gate to recover the at least one original file, and/or
   wherein the authentication data of at least two separate users represent asymmetric encryption keys, and/or
   wherein the authentication data are derived from user identity.

4. The system according to claim 2,
   wherein a user input is a file opening request or an input action with the aid of an input device.

5. The system according to claim 2,
   wherein the at least one data gate is further configured to generate the security data on the basis of the authentication data.

6. The system according to claim 2,
   wherein at least one key for decryption and/or encryption is defined for a group of authentication data.

7. The system according to claim 1,
   wherein the at least one data gate is further configured to divide and/or store the at least one encrypted file on at least two of the at least one data storage.

8. The system according to claim 1,
   wherein the at least one data storage is connected to the Internet.

9. The system according to claim 1,
   wherein the at least one data storage is configured to manage handling of the at least one virtual file in workflows.

10. The system according to claim 1,
    wherein security information with at least parts of keys or keys is linked and/or stored with reference to the at least one virtual file and/or the at least one encrypted file.

11. The system according to claim 1,
    wherein decryption uses key data in reference security data of each of the at least one virtual file.

12. A method for secure data handling, comprising the steps of:
    generating and/or storing at least one virtual file comprising at least parts of meta data on the basis of at least one original file comprising content data and/or the meta data with the aid of at least one data gate,
    adding security data by the at least one data gate to the at least ore virtual file,
    dividing a business layer comprising the virtual file from an encryption layer comprising a plurality of chunks of at least one encrypted file, and
    storing the at least one encrypted file in predefined restricted regions with respect to at least one data storage,
    wherein access is forbidden between the predefined restricted regions and the at least one data storage and access is allowed between an allowed region and the at least one data storage, and
    wherein a workflow is accepted between the allowed region and a cloud environment and/or between the cloud environment and the predefined restricted region.

13. The method according to claim 12, further comprising at least one of the steps of:
    generating and/or storing the at least one encrypted file on the basis of the at least one original file using at least parts of authentication data of users accessing the at least one data gate as key, and/or
    receiving and/or processing at least one user input signal with respect to the at least one virtual file, and/or
    recovering the at least one original file on the basis of the at least one encrypted file using at least parts of the authentication data as key.

14. The method according to claim 13,
    wherein the at least one user input signal with respect to the at least one virtual file is an initiator for the at least one data gate to recover the at least one original file, and/or
    wherein the authentication data of at least two separate users represent asymmetric encryption keys.

15. The method according to claim 12, further comprising the step of dividing and/or storing the at least one encrypted file on at least two data storages.

16. The method according to claim 12, further comprising the step of using key data in reference security data of each of the at least one virtual file for decryption.

\* \* \* \* \*